United States Patent [19]

Mowill

[11] 4,188,169
[45] Feb. 12, 1980

[54] IMPELLER ELEMENT OR RADIAL INFLOW GAS TURBINE WHEEL

[76] Inventor: Jan Mowill, Daniel Barths vei 11, 3600 Kongsberg, Norway

[21] Appl. No.: 823,187

[22] Filed: Aug. 9, 1977

[30] Foreign Application Priority Data

Aug. 11, 1976 [NO] Norway .................................. 762794

[51] Int. Cl.² .............................................. F01D 5/04
[52] U.S. Cl. ...................................... 416/185; 416/188
[58] Field of Search ............... 416/181, 188, 183, 185; 415/213 B, 213 R

[56] References Cited

U.S. PATENT DOCUMENTS 3,927,952  12/1975  Kirby ................................ 416/181 X

FOREIGN PATENT DOCUMENTS

| 2062534 | 3/1972 | Fed. Rep. of Germany | 416/181 |
| 1236779 | 6/1960 | France | 416/185 |
| 1248048 | 10/1960 | France | 416/181 |
| 848562 | 9/1960 | United Kingdom | 416/185 |
| 918674 | 2/1963 | United Kingdom | 416/188 |

Primary Examiner—Everette A. Powell, Jr.
Attorney, Agent, or Firm—Holman & Stern

[57] ABSTRACT

In an impeller element of a radial inflow gas turbine the shape of the blades and the outer profile of the hub are such as to make the impeller symmetric about two planes, one through the axis of rotation and one normal to it, the impeller thus deviating from the conventional shape of radial inflow gas turbine impellers, which to a considerable degree has been adapted to the theoretical path of the gas.

4 Claims, 4 Drawing Figures

IMPELLER ELEMENT OR RADIAL INFLOW GAS TURBINE WHEEL

BACKGROUND OF THE INVENTION

This invention relates to radial inflow turbines having a turbine wheel divided in a disc-shaped impeller element and an exducer portion, the exducer and the impeller being clamped together or otherwise connected in the axial direction of the wheel. More specifically, the invention relates to the impeller or centripetal flow accommodating element of the wheel. The exducer portion, which largely accommodates the axial portion of the flow, may be composed of a plurality of elements in the form of star-shaped discs. However, the impeller element of the invention may also be used with a conventional exducer consisting of a single, integral element.

In order to reduce cost per horsepower and improve thermal efficiency it is desirable to design radial inflow gas turbines for higher temperatures and higher peripheral speeds than what is usual today. As is known, the characteristics of the material are impaired at higher temperatures, and with higher peripheral speeds the stresses in the impeller will increase. With increasing temperature, corrosion also becomes more severe. One has previously tried to meet the more severe operational demands by the use of better materials in the turbine by cooling the blades and by improving the geometry of the turbine wheel. However, the use of high strength superalloys such as Astroloy and IN-100 has largely been limited by the restrictions of manufacturing processes with respect to the casting and forging as well as the machining of large complicated shapes. To provide cooling also causes many problems. It is therefore increasingly important to improve the basic geometry of the turbine wheel so that it will be able to withstand more severe operating conditions. The impeller element has the largest diameter and therefore the highest peripheral speed and is accordingly subjected to the highest stresses and also to the highest temperatures.

SUMMARY OF THE INVENTION

The object of the invention is to provide an impeller element of a radial inflow turbine of the type described above having an improved geometry which gives better utilization of the material therein with respect to withstanding stresses and other operationally induced conditions and which at the same time provides advantages regarding the accuracy of stress calculations, the feasibility of ultrasonic inspection and other nondestructive methods and the attainment of high quality preferential heat treatment (differentiated heat treatment along the radial extent of the impeller) as well as low cost.

The impeller element according to the invention is characterized in that the thickness or circumferential dimension of each impeller blade at any given radial station of the impeller element is generally uniform over substantially the entire axial length of the impeller element. In the preferred embodiment the blades extend in an axial plane, whereby the cross-sectional shape of each blade at any given distance from the axis of the impeller element is generally rectangular.

In this context, the blades are defined as the portions of the impeller positioned radially outwards of the innermost points of the interblade scallops, the remaining portions of the impeller element defining the hub thereof. As a consequence of the prescribed uniform thickness of the blades, the hub of the impeller element is defined by an imaginary circular-cylindrical surface coaxial with the axis of the impeller. Subject to modifications caused by fastening and locating arrangements and local stress considerations, this in turn implies that the hub will be symmetrical to a center plane normal to the axis of the hub. The same will hold true for the blades if truly axial. If the blades form a constant angle with an axial plane, they will be substantially symmetrical about a radial center axis. Thus, the uniform thickness of the blades means that the centrifugal forces on the blades will be balanced with respect to a center plane normal to the axis of the turbine wheel and thus not cause substantial bending moments in the main plane of the blades. The forward and rear end surfaces of the impeller blades are preferably parallel prior to any final machining operation thereof. The impeller element according to the invention will be shorter in the axial direction than conventional impeller elements, the axial length being close to the tip width of the turbine wheel blades. The interface between the blades of the impeller and the blades of the exducer will therefore be further upstream in the flow path than conventionally, thus minimizing the losses due to leakage between the pressure and suction sides of the blade path.

The requirement that the blades should have a generally uniform thickness along substantially the entire axial length of the element, does not exclude small modifications of the radially outer profile of the blades to adapt it to the contour of the turbine housing or for other purposes. Thus, the rear and/or forward end surfaces of the blades may be slightly cut back. Also, fastening arrangements in the hub portion will, of course, have to be additionally provided for.

The geometry of the impeller element defined above gives a better utilization of the characteristics of the material of the impeller hub and blades in that a better and more uniform distribution of the stresses is achieved, allowing higher loads on the wheel for a given amount of material. Hitherto, the outer profile of the hub has had a shape which to a considerable degree has been adapted to the theoretical path of the gas, the difference between the largest and the smallest diameter of the impeller hub being considerable. Such a configuration of the impeller hub has been regarded as advantageous from an aerodynamic point of view. However, it has now been found that it is far more important to avoid local peak stresses and have nearly constant stresses in the impeller, thereby to obtain the highest possible strength with a given volume of material. According to the invention, the impeller should therefore have symmetrical blades as outlined above and a hub having an outer profile which is substantially parallel to the axis of the wheel. Small radii which are provided for production reasons or to reduce stress concentrations on edges as well as small deviations from the parallel may occur without the resulting structure falling outside the scope of the invention. Due to the shape of the overall turbine and the requirement for a sufficient exit area, the interface between the turbine impeller element and the exducer portion may produce a step. In the "corner" created by such a step a flow portion with recirculating fluid is obtained. However, the flow in the turbine is an expanding flow, and it is to be expected that the flow medium in this portion will provide a fluidic profile, so that the step will therefore have only a minor influence on the efficiency of the turbine wheel, due to the characteristics of an expanding flow and the relatively long total flow path within the turbine wheel. The positive effects of the increased temperature and speed at which this simple impeller can operate because of increased specific strength are of far greater importance to the overall performance and usage of the gas turbine engine. Because of the geometric simplicity of the turbine impeller, precision casting, precision forging and other methods of achieving the required shape and quality will be much easier. The use of ceramics and composites would be facilitated by this simple geometry. The simple geometric shape with essentially two-dimensional surfaces would more easily lend itself to cooling arrangements than would the more complex surfaces usually found in conventional axial and radial turbines. The resulting impeller will also cost considerably less than conventionally shaped impellers and will therefore imply smaller expenses in case of replacement.

The exducer portion may consist of elements in the form of precision-forged or precision-cast blanks of the same general shape as the impeller element of the invention and identical with the latter in other respects. It is then possible to utilize the same blanks for all the exducer elements and at the same time provide for easy machining of any cooling conduits in the blades. Any final machining operation may mainly be limited to the shaping of the outer diameter of the blades. However, the impeller element of the invention may also be used together with a single, integral, conventional exducer or by itself.

In contrast to normal practice, the blades of the impeller element may form an angle with an axial plane—i.e. the twist of the exducer blades may continue into the impeller blades. However, the impeller blades are preferably axial. They may be curved in the axial direction and at the trailing edge make the same angle with the axial plane as the blades of the exducer elements, whereby a smooth junction between the blades of the impeller and those of the exducer is achieved.

In its preferred embodiment the turbine impeller according to the invention is essentially symmetric about two planes, one through the axis of rotation and one normal to it. This provides a more even and symmetrical stress distribution resulting in better material utilization than is the case in conventional radial inflow turbines.

The impeller according to the invention will exhibit a smaller difference between the average and maximum stresses than in a conventional radial turbine. This entails that the average stresses could be higher than in a conventional turbine, but that the maximum stresses would be equal to or lower than in a conventional radial design. A simple symmetric form is also advantageous in minimizing thermal stresses. Apart from the actual stress levels obtained, there is a greater degree of assurance in assessing the stress level, and "safety factors" may therefore be reduced as compared to normal practice.

A better than usual material utilization follows from a situation where maximum and average stresses are near each other in magnitude. In addition to giving cost reduction this feature also reduces the weight of the component, which would be important in applications such as in aircraft usage.

Easy replacement or repair of the low cost impeller along with a higher confidence level in quality assurance, are important advantages according to this invention. By segregating a smaller portion of the overall turbine in the impeller portion, the exducer portion becomes relatively more costly. However, since the stresses and temperatures are lower in this part, one can have a substantially longer component life available for this more expensive part, which according to experience is also much less exposed to damage and wear than the impeller.

Additional features and advantages will become apparent from the following description, reference being had to the drawings, which schematically show a preferred embodiment of a radial inflow turbine wheel impeller element according to the invention.

DETAILED DESCRIPTION OF A PREFERRED EMBODIMENT

Figure 2:
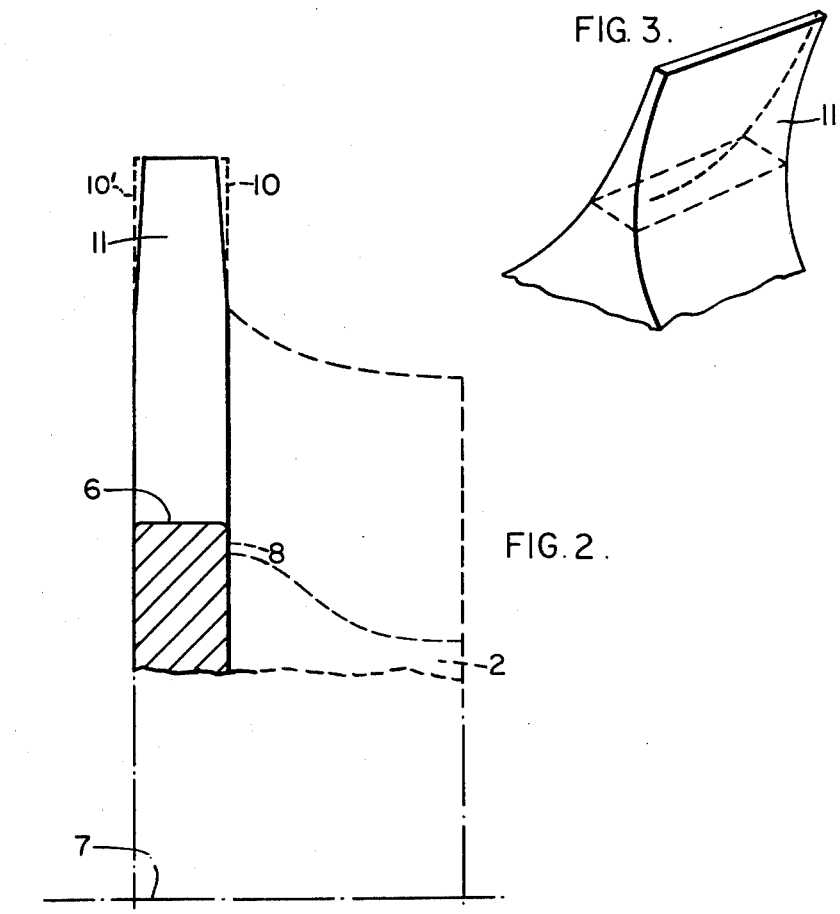
FIG. 2 is a fragmentary axial section of the impeller element, an exducer portion being indicated in dashed lines.
Figure 4:
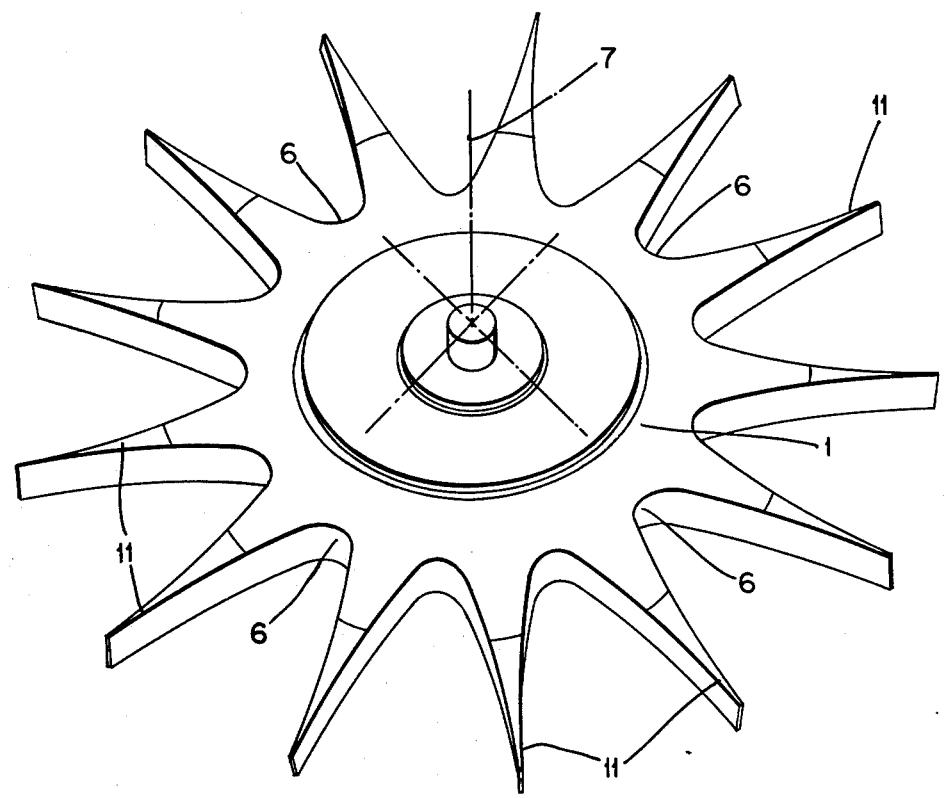

In FIG. 2 the turbine impeller element 1 is shown in conjunction with a conventional exducer 2. However, the exducer may be split into several elements of similar shape as the impeller. The elements may be joined by any suitable method such as brazing, welding or tie bolt clamping or may be formed integrally with the impeller. The elements will have suitable piloting geometry at their interface. One piloting means or arrangement may consist of mating end surfaces on the blades, which surfaces will serve the purpose of properly piloting or dampening the elements.

The impeller 1 in FIG. 2 of the turbine wheel is shorter than normal, having an axial length nearly the same as the tip of the turbine blades, i.e. the radially outermost portion of the blades where the hot gases enter the turbine wheel. The impeller 1 has a hub with an outer profile 6 which is generally parallel to the centerline or axis 7 of the wheel, which may result in a "step" 8. This step is not in itself desirable, but may result from the new configuration of the hub of the impeller 1.

As is evident from FIG. 2, the rear end surface of the blades 11 of the impeller element 1 may be slightly cut back at the radially outer end of each blade as indicated by the dashed line 10. If desired, the forward end surface may be similarly cut back, as at 10', so as not substantially to disturb the desired balance with respect to the centre axis of each blade.

Figure 1:
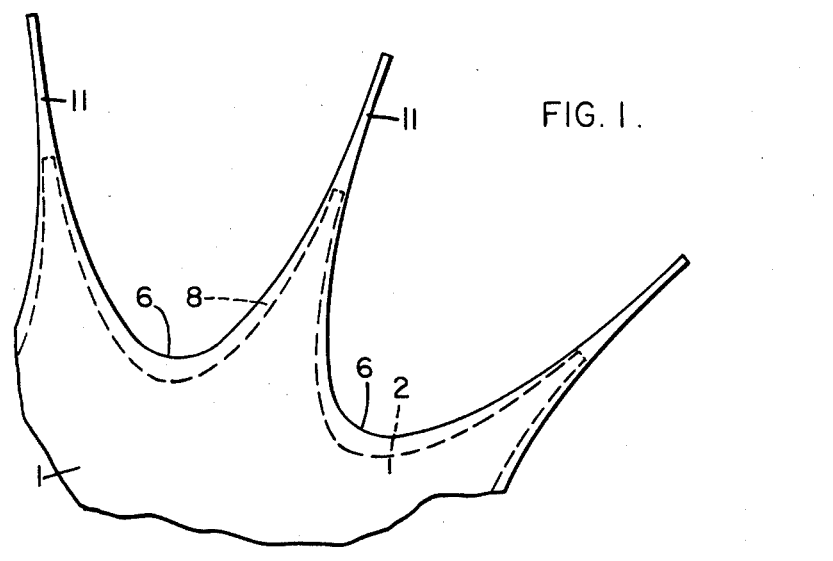
FIG. 1 is a fragmentary front view of an impeller element according to the invention.
Figure 3:
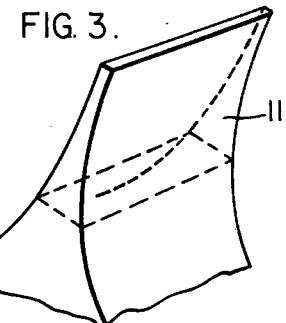
FIG. 3 is a fragmentary, perspective view of a blade.

The cutback operation would be a final machining operation effected after the impeller element has been heat treated and tested, for example by ultrasonic testing. In the preferred embodiment of the impeller, the cross-sectional shape of each blade is rectangular as shown in FIG. 3. This greatly facilitates calculation, manufacture and ultrasonic inspection. Accordingly, the impeller of the invention prior to final machining has what may be termed a "sonic" shape. Machining after sonic or X-ray testing should be kept at a minimum since the materials involved are extremely difficult to machine and are also very expensive.

The radial inflow gas turbine wheel impeller design according to this invention results in a number of advantages. The most important advantages lie in the stress balanced design of the blades of the impeller element, providing for an optimal utilization of the strength characteristics of the material by reducing bending and eliminating high stress peaks. Due to the regularity of the geometry, better control of material properties by preferential heat treatment is obtained.

The step 8 may vary strongly in shape and size depending on the matching configuration of the exducers. The losses that may result from a step in the flow path are expected to be insignificant due to expanding flow and general aerodynamic insensitivity experienced in radial turbine flow paths. Accordingly, any such loss is of less consequence than the increased strength available with this geometry and the materials that may be used with this geometry due to the fact that it will allow higher temperatures and tip speeds resulting in higher overall thermal efficiencies and higher power output for a complete gas turbine engine in addition to the advantages of design, production and quality assurance available through this invention.

What I claim is:

1. A radial inflow gas turbine wheel element adapted to be operatively associated with a turbine exducer portion, said wheel element having an axis and a plane of rotation, a hub portion, and a plurality of blades extending from said hub portion; each blade having an axial length, a radial length, and a thickness, said thickness of each blade taken in a plane normal to the plane of rotation and parallel to the axis of the element at any given radial station being generally uniform over substantially the entire axial length of said blade and said hub portion having an outer profile which is substantially parallel to the axis of rotation.

2. The wheel element according to claim 1, wherein the cross-sectional shape of each blade at any given radial station of the wheel element is generally rectangular.

3. The wheel element according to claim 2, wherein the axial length of each blade is substantially constant along the radial length of the blade.

4. The wheel element according to claim 2, wherein the axial length of the wheel element is nearly the same as the tip width of the blade.

* * * * *